US010837899B2

(12) United States Patent
Chen

(10) Patent No.: US 10,837,899 B2
(45) Date of Patent: Nov. 17, 2020

(54) LASER SENSOR, ELECTRONIC DEVICE AND COMPUTER-READABLE STORAGE MEDIUM

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/436,897

(22) Filed: Jun. 10, 2019

(65) Prior Publication Data

US 2020/0033255 A1 Jan. 30, 2020

(30) Foreign Application Priority Data

Jul. 25, 2018 (CN) .......................... 2018 1 0828905

(51) Int. Cl.
*G01N 21/00* (2006.01)
*G01N 21/35* (2014.01)

(52) U.S. Cl.
CPC ..... *G01N 21/35* (2013.01); *G01N 2201/1211* (2013.01)

(58) Field of Classification Search
CPC ... H01J 37/32935; G01N 21/64; G01N 21/68; G01N 2015/1037; G01J 3/02
(Continued)

(56) References Cited

U.S. PATENT DOCUMENTS 6,852,966 B1 2/2005 Douma et al.
8,947,659 B1 * 2/2015 Baastians .............. G01N 21/65 356/301

(Continued)

FOREIGN PATENT DOCUMENTS

CN 104316090 A 1/2015
CN 104864911 A 8/2015

(Continued)

OTHER PUBLICATIONS

European Patent Office, Extended European Search Report mailed in Application No. 19187874.3, dated Nov. 27, 2019, Germany, 8 pages.

(Continued)

*Primary Examiner* — Md M Rahman
(74) *Attorney, Agent, or Firm* — Syncoda LLC; Feng Ma

(57) ABSTRACT

A laser sensor includes: a receiver array configured to convert received optical signals into electrical signals, wherein a noise floor of the electrical signals is positively correlated with temperature if environmental temperature is within a first preset temperature range, and negatively correlated with the temperature if the environmental temperature is within a second preset temperature range; a compensation module coupled with the receiver array and configured to receive the electrical signals, amplify the electrical signals with a first and a second amplification factors, respectively, when the environmental temperature is within the first and the second preset temperature ranges, wherein the first amplification factor is negatively correlated with the temperature and the second amplification factor is positively correlated with the temperature; and a processor coupled with the compensation module and configured to identify sensing signals based on the electrical signals amplified by the compensation module and the noise floor.

20 Claims, 4 Drawing Sheets

(58) Field of Classification Search
USPC .......................................................... 356/72
See application file for complete search history.

(56) References Cited

U.S. PATENT DOCUMENTS

2004/0245436 A1 12/2004 Matsumoto
2014/0152972 A1 6/2014 Robertson et al.
2014/0376579 A1* 12/2014 Wach .................... H01S 5/0683
372/34
2018/0006756 A1 1/2018 Ishii
2001/8180471 6/2018 Marra Martin et al.
2018/0180471 A1 6/2018 Marra et al.

FOREIGN PATENT DOCUMENTS

CN 206638581 U 11/2017
EP 1039597 A2 9/2000

OTHER PUBLICATIONS

State Intellectual Property Office of the People's Republic of China, Office Action and Search Report Issued in Application No. 2018108289056, dated Mar. 19, 2020, 10 pages, (Submitted with Machine Translation).

* cited by examiner

LASER SENSOR, ELECTRONIC DEVICE AND COMPUTER-READABLE STORAGE MEDIUM

CROSS-REFERENCE TO RELATED APPLICATION

This application claims priority to Chinese patent application No. 201810828905.6, filed on Jul. 25, 2018, the disclosure of which is incorporated herein by reference in its entirety.

BACKGROUND

Noise floor is defined as the sensing signals generated without reflective surfaces in the environment, which is produced mainly by laser signals reflected from protective glasses set on laser sensors, and optical signals in the environment.

SUMMARY

The present disclosure relates to the field of terminal technologies, and more particularly to a laser sensor, an electronic device and a computer-readable storage medium.

In an aspect, a laser sensor is provided, including:

a receiver array adapted for converting received optical signals into electrical signals, wherein the noise floor of electrical signals is positively correlated with temperature if environmental temperature is within the first preset temperature range, while if the environmental temperature is within the second preset temperature range, the noise floor of electrical signals is negatively correlated with temperature;

a compensation module, connected with the receiver array and designed to receive the electrical signals, the compensation module amplifying the electrical signals with the first amplification factor when the environmental temperature is within the first preset range, while amplifying with the second amplification factor when the environmental temperature is within the second preset range, wherein the first amplification factor is negatively correlated with temperature, while the second factor is positively correlated with temperature; and a processor, connected with the compensation module and designed to identify sensing signals based on the electrical signals amplified by the compensation module and the preset noise floor.

In some embodiments, the compensation module includes:

a temperature sensor, which is designed to sense environmental temperature;

a switching module, the first end of which is connected with the temperature sensor, to receive environmental temperature sensed by the temperature sensor, and the second end of which is connected with the receiver array; if the environmental temperature is within the first preset range, the third end of the switching module connected with the first amplifying circuit, which is designed to input the electrical signals into the first amplifying circuit, while, if the environmental temperature is within the second preset range, the third end of the switching module connected with the second amplifying circuit, which is designed to input the electrical signals into the second amplifying circuit;

wherein as for the first amplifying circuit, the amplification factor is the first amplification factor;

wherein as for the second amplifying circuit, the amplification factor is the second amplification factor.

In some embodiments, the first amplifying circuit includes:

a first operational amplifier, wherein the positive input end of the first operational amplifier is connected with the third end of the switching module;

a first resistor, wherein one end of the first resistor is connected with the positive input end of the first operational amplifier, and the other end of the first resistor is connected with the output end of the first amplifier; and a second resistor, wherein one end of the second resistor is connected with the negative input end of the first operational amplifier, and the other end of the second resistor is ground connected;

wherein, the resistance value of the first resistor is negatively correlated with temperature, and/or the resistance value of the second resistor is positively correlated with temperature.

In some embodiments, the second amplifying circuit includes:

a second operational amplifier, wherein the positive input end of the second operational amplifier is connected with the third end of the switching module;

a third resistor, wherein one end of the third resistor is connected with the positive input end of the second operational amplifier, and the other end of the third resistor is connected with the output end of the second amplifier;

a fourth resistor, wherein one end of the fourth resistor is connected with the negative input end of the second operational amplifier, and the other end of the fourth resistor is ground connected;

wherein, the resistance value of the third resistor is positively correlated with temperature, and/or the resistance value of the fourth resistor is negatively correlated with temperature.

In some embodiments, the receiver array includes several avalanche photodiodes.

In some embodiments, the optical signals are infrared laser signals.

In some embodiments, the laser sensor further includes: vertical external surface emission laser, which is designed to send infrared laser signals.

In some embodiments, the vertical external surface emission laser can send lasers ranging from 850 nm to 940 nm.

In another aspect, an electronic device is provided, including:

a laser sensor, wherein the laser sensor includes:

a receiver array, which converts received optical signals into electrical signals, and, if environmental temperature is within the first preset temperature range, the noise floor of electrical signals is positively correlated with temperature, while if the environmental temperature is within the second preset temperature range, it is negatively correlated with temperature;

a compensation module, connected with the receiver array, is designed to receive the electrical signals, and to amplify electrical signals with the first amplification factor when environmental temperature is within the first preset range, while amplify with the second amplification factor when environmental temperature is within the second preset range, and the first amplification factor is negatively correlated with temperature, while the second factor is positively correlated with temperature;

a processor, connected with the compensation module, which is designed to identify sensing signals based on the electrical signals amplified by the compensation module and the preset noise floor; and a storage, which is designed to store executable instructions of the processor.

In some embodiments, the compensation module includes:

a temperature sensor, which is designed to sense environmental temperature;

a switching module, the first end of the switching module is connected with the temperature sensor, to receive environmental temperature sensed by the temperature sensor; the second end of the switching module is connected with the receiver array; if environmental temperature is within the first preset range, the third end of the switching module is connected with the first amplifying circuit, which is designed to input the electrical signals into the first amplifying circuit, while, if environmental temperature is within the second preset range, the third end of the switching module is connected with the second amplifying circuit, which is designed to input the electrical signals into the second amplifying circuit;

wherein as for the first amplifying circuit, amplification factor is the first amplification factor;

wherein as for the second amplifying circuit, amplification factor is the second amplification factor.

In some embodiments, the first amplifying circuit includes:

a first operational amplifier, the positive input end of the first operational amplifier is connected with the third end of the switching module;

a first resistor, one end of the first resistor is connected with the positive input end of the first operational amplifier, and the other end of the first resistor is connected with the output end of the first amplifier;

a second resistor, one end of the second resistor is connected with the negative input end of the first operational amplifier, and the other end of the second resistor is ground connected;

wherein the resistance value of the first resistor is negatively correlated with temperature, and/or the resistance value of the second resistor is positively correlated with temperature.

In some embodiments, the second amplifying circuit includes:

a second operational amplifier, wherein the positive input end of the second operational amplifier is connected with the third end of the switching module;

a third resistor, wherein one end of the third resistor is connected with the positive input end of the second operational amplifier, and the other end of the third resistor is connected with the output end of the second amplifier;

a fourth resistor, wherein one end of the fourth resistor is connected with the negative input end of the second operational amplifier, and the other end of the fourth resistor is ground connected;

wherein the resistance value of the third resistor is positively correlated with temperature, and/or the resistance value of the fourth resistor is negatively correlated with temperature.

In some embodiments, the receiver array includes several avalanche photodiodes.

In some embodiments, the optical signals are infrared laser signals.

In some embodiments, the laser sensor further includes: vertical external surface emission laser, which is designed to send infrared laser signals.

In some embodiments, the vertical external surface emission laser can send lasers ranging from 850 nm to 940 nm.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the laser sensor is integrated with the mobile phone; in some other embodiments, the laser sensor can be a plug-and-play device for the mobile phone, and can access and be controlled by the programs/apps/instructions stored on the phone. In some implementations, the laser sensor can draw power from the phone. In some other implementations, the laser sensor can have its own battery.

In another aspect, a computer-readable storage medium is provided, which stores computer programs, following the steps below when executed by a processor:

converting received optical signals into electrical signals, and wherein, if environmental temperature is within the first preset temperature range, the noise floor of electrical signals is positively correlated with temperature, while, if environmental temperature is within the second preset temperature range, it is negatively correlated with temperature;

amplifying electrical signals with the first amplification factor when environmental temperature is within the first preset range, while amplifying with the second amplification factor when environmental temperature is within the second preset range, wherein the first amplification factor is negatively correlated with temperature, while the second factor is positively correlated with temperature;

identifying sensing signals based on the amplified electrical signals and the preset noise floor.

It should be understood that both the foregoing general description and the following detailed description are exemplary and explanatory only and are not restrictive of the disclosure.

BRIEF DESCRIPTION OF THE DRAWINGS

The accompanying drawings which are incorporated in and constitute a part of the present disclosure, illustrate embodiments consistent with the disclosure and, together with the description, serve to explain some embodiments of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The inventors of the present application have recognized that, to get accurate sensing signals, it is generally calculated by subtracting predicted noises from original signals (including sensing signals and the noise floor). However, due to the structure and other characteristics of current laser sensors, the noise floor will change with temperature, that is, the noise floor in original signals will change with temperature. However, the estimated noise floor value subtracted in the calculation process is a fixed value, which result in different degrees of excluding noises at different temperatures, which in turn, causes sensing signals after the noise is removed to be inaccurate, resulting in large deviations in sensing results. Noise floors in related technical fields vary greatly with temperature, so after the fixed preset noise floor is subtracted, the remaining values are still changeable, that is, the sensing signal obtained is not accurate; according to the embodiment of the present disclosure, the compensated noise floor changes little with temperature, thus the remaining value after fixed preset noise is subtracted also varies little, and then, the remaining value is divided by the amplification factor. The value is relatively accurate, which is conducive to obtaining accurate sensing results.

The laser sensor shown in this embodiment can be used for sensing distance, and can be applied to electronic devices such as mobile phones, and can also be applied to carriers such as vehicles, and can be installed on other devices as needed.

Figure 1:
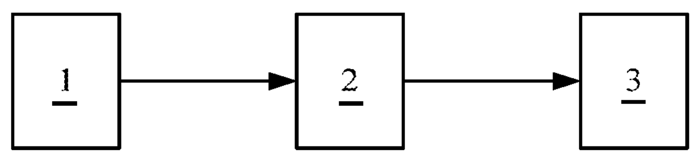
FIG. 1 is a schematic structural diagram illustrating a laser sensor according to some embodiments.

As shown in FIG. 1, a laser sensor includes the following structure:

A receiver array 1, which converts received optical signals into electrical signals, and, if environmental temperature is within the first preset temperature range, the noise floor of electrical signals is positively correlated with temperature, while if the environmental temperature is within the second preset temperature range, it is negatively correlated with temperature.

In some embodiments, the receiver array 1 may be composed of a plurality of photodiodes, wherein the photodiodes may be avalanche photodiodes.

In some embodiments, the receiver array 1 can receive optical signals, such as optical signals that are emitted by the laser emitter and reflected by the object into the receiver array 1. Wherein optical signals may be visible light signals or non-visible light signals, such as infrared laser signals. The receiver array 1 can convert the received optical signals into electrical signals and transmit electrical signals to the compensation module 2.

A compensation module 2, connected with the receiver array 1, is designed to receive the electrical signals, and to amplify electrical signals with the first amplification factor when environmental temperature is within the first preset range, while amplify with the second amplification factor when environmental temperature is within the second preset range, wherein the first amplification factor is negatively correlated with temperature, while the second factor is positively correlated with temperature.

In some embodiments, compensation module 2 can enlarge or reduce electrical signals, in the case where the amplification factor is greater than 1, the electrical signal is amplified by the compensation module 2, and in the case where the amplification factor is less than 1, and the electrical signal is reduced after passing through the compensation module 2.

In some embodiments, the electrical signal, such as current signal I, may include an induced signal $I_1$ and a noise floor $I_2$, where the electrical signal is generated from an optical signal reflected by an external object. Defining the amplification factor of the compensation module 2 as F, the electrical signal amplified by the compensation module 2 $I'=IF$. Amplify electrical signals I with the first amplification factor when environmental temperature is within the first preset range, that is $F=F_1$, amplify electrical signals I with the second amplification factor $F_2$ when environmental temperature is within the second preset range, that is $F=F_2$.

It should be noted that the first preset range, the second preset range, the first amplification factor and the second amplification factor can be set as needed, for example, the temperature corresponding to the maximum noise floor of the electrical signal may be the boundary point between the first preset range and the second preset range, e.g. when the temperature is 25°, the noise floor of the electrical signal is the largest, then the first preset range can be set to (−∞, 25°), and the second preset range to be (25°, ∞).

A processor 3, is connected with the compensation module 2, which is designed to identify sensing signals based on the amplified electrical signals and the preset noise floor. It should be noted that the processor 3 may be directly connected to the compensation module 2, or may be connected to the compensation module 2 through other modules, such as an analog-to-digital conversion module (not shown in the drawings).

In some embodiments, the preset noise floor may be a mean value of the noise floor within a common temperature range of the laser sensor, such as a mean value of the bottom noise within a range of minus 20 degrees to a range of 40 degrees above zero, or may be a corresponding noise floor at a certain temperature, such as the corresponding noise floor at 25°.

In the related art, there is no processing by the compensation module 2, so $I=I_1+I_2$. If the sensing signal $I_1$ can be obtained by subtracting the noise floor $I_0$, but since the $I_2$ changes with temperature, the obtained $I_1$ value still has a large value change, and the sensing signal $I_1$ does not actually change with temperature, thus it can be seen that sensing signal $I_1$ obtained is not accurate.

According to some embodiments, the preset noise floor $I_0$ can be subtracted from the amplified electrical signal I', and then divided by the amplification factor F of the compensation module 2 to obtain the sensing signal $I_1$.

Since $I'=IF=(I_1+I_2)F=I_1F+I_2F$, wherein, in the first preset range, F is equal to the first amplification factor $F_1$, the noise floor $I_2$ is positively correlated with temperature, and $F_1$ is negatively correlated with temperature. Therefore, the compensated noise floor $I_2F_1$ changes less with temperature in the first preset range; in the second preset range, F is equal to the second amplification factor $F_2$, the noise floor $I_2$ is negatively correlated with temperature, and $F_2$ is positively correlated with temperature, therefore, the compensated noise floor $I_2F_2$ varies less with temperature within the second preset range.

Figure 2:
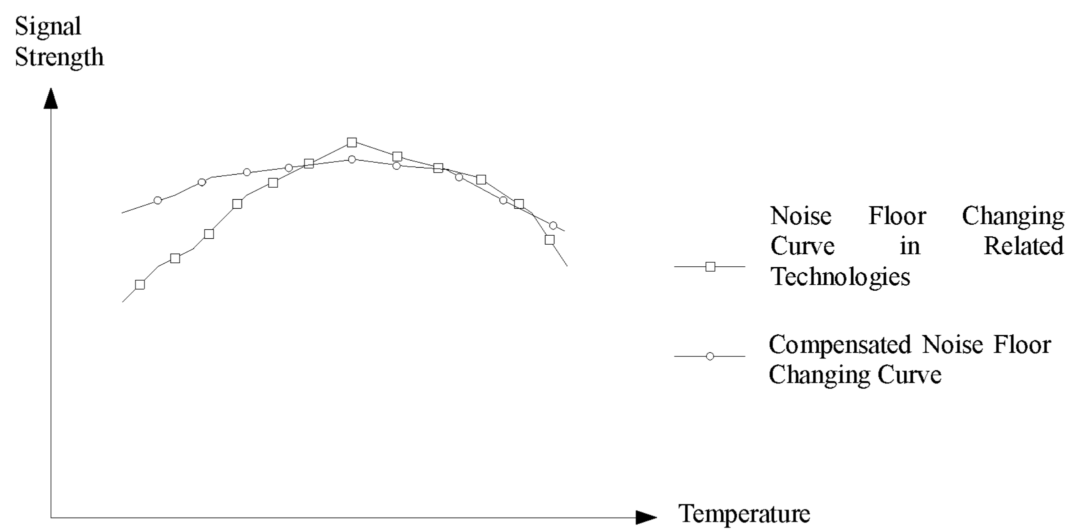
FIG. 2 is a comparison schematic structural diagram for noise floor changing curve in related technology areas versus the compensated noise floor changing curve according to some embodiments.

As shown in FIG. 2, noise floors $I_2$ in related technical fields vary greatly with temperature, so after the fixed preset noise floor is subtracted, the remaining values are still changeable, that is, the sensing signal $I_1$ obtained is not accurate. According to some embodiments, the compensated noise floor $I_2F$ changes little with temperature, thus the remaining value $I_1F$ after fixed preset noise is subtracted also varies little, and then, the remaining value $I_1F$ is divided by the amplification factor F (the value of F can be determined according to the temperature). So $I_1$ is relatively accurate, which is conducive to obtaining accurate sensing results.

Figure 3:
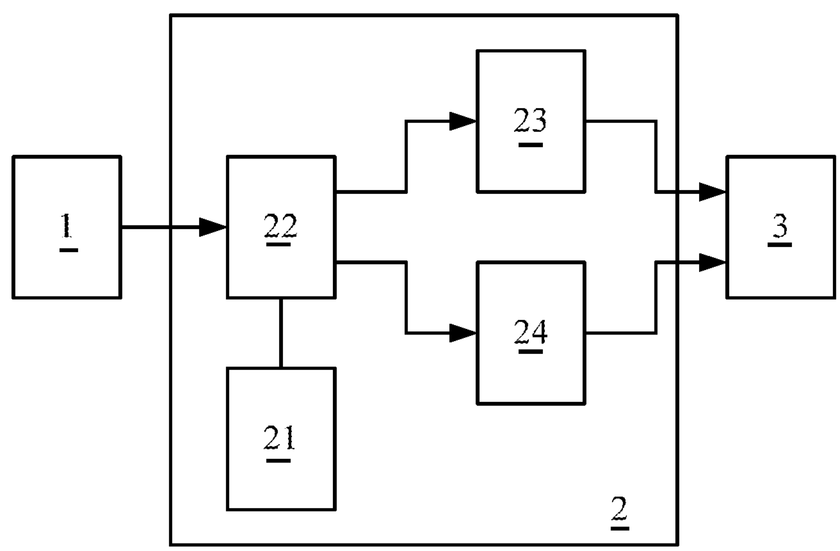
FIG. 3 is a schematic structural diagram for another laser sensor according to some embodiments.

As shown in FIG. 3, the compensation module 2 includes:

A temperature sensor 21, which is designed to sense environmental temperature.

A switching module 22, the first end of the switching module 22 is connected with the temperature sensor 21, to receive environmental temperature sensed by the temperature sensor 21; the second end of the switching module 22 is connected with the receiver array 1; if environmental temperature is within the first preset range, the third end of the switching module 22 is connected with the first amplifying circuit 23, which is designed to input the electrical signals into the first amplifying circuit 23, while, if environmental temperature is within the second preset range, the third end of the switching module 22 is connected with the second amplifying circuit 24, which is designed to input the electrical signals into the second amplifying circuit 24.

Wherein the amplification factor of the first amplifying circuit 23 is the first amplification factor; the amplification factor of the second amplifying circuit 24 is the second amplification factor.

In some embodiments, the switching module 22 determines the ambient temperature by accepting the temperature value sensed by the temperature sensor 21, and thereby switches the amplifying circuit that is turned on with the receiver array 1 according to the ambient temperature.

Wherein, when the ambient temperature is within the first preset range, the first amplifying circuit 23 with the first amplification factor may be turned on and the receiver array 1 is turned on, so that considering the noise floor of the electrical signal is positively correlated with the temperature, the first amplification factor that is negatively correlated with the temperature compensates for the noise floor and reduces the rate of change of the noise floor within the first preset range.

When the ambient temperature is within the second preset range, the second amplifying circuit 24 with the second amplification factor may be turned on and the receiver array 1 is turned on, so that considering the noise floor of the electrical signal is negatively correlated with the temperature, the first amplification factor that is positively correlated with the temperature compensates for the noise floor and reduces the rate of change of the noise floor within the second preset range.

Figure 4:
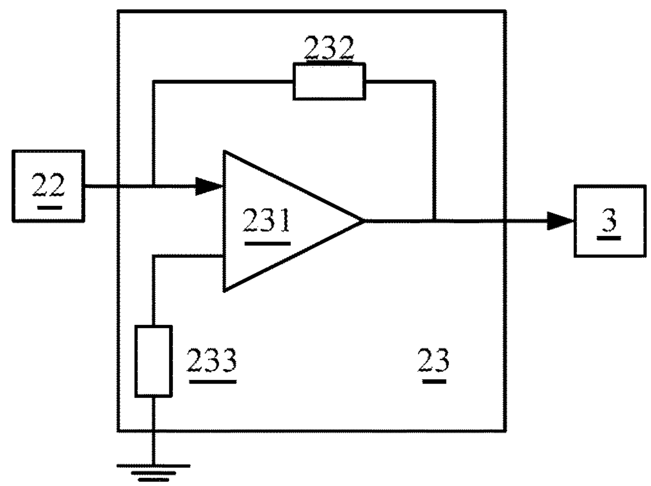
FIG. 4 is a schematic structural diagram for first amplifying circuit according to some embodiments.

As shown in FIG. 4, the first amplifying circuit 23 includes:

The first operational amplifier 231, the positive input end of the first operational amplifier 231 is connected with the third end of the switching module 22;

The first resistor 232, one end of the first resistor 232 is connected with the positive input end of the first operational amplifier 231, and the other end of the first resistor 232 is connected with the output end of the first amplifier 231;

The second resistor 233, one end of the second resistor 233 is connected with the negative input end of the first operational amplifier 231, and the other end of the second resistor 233 is ground connected;

Wherein, the resistance value Rf1 of the first resistor 232 is negatively correlated with temperature, and/or the resistance value Rin1 of the second resistor 233 is positively correlated with temperature.

In some embodiments, the first operational amplifier 231, the first resistor 232, and the second resistor 233 are connected according to the connection manner shown in FIG. 4, so that the first amplification factor $F_1$ of the first amplification circuit 23 is F1=Rf1/Rin1, so by setting the resistance value Rf1 of the first resistor 232 to be negatively correlated with temperature, and/or the resistance value Rin1 of the second resistor 233 to be positively correlated with the temperature, the first amplification factor F1 can be negatively correlated with the temperature, thereby achieving compensation for noise floor in the first preset range.

Figure 5:
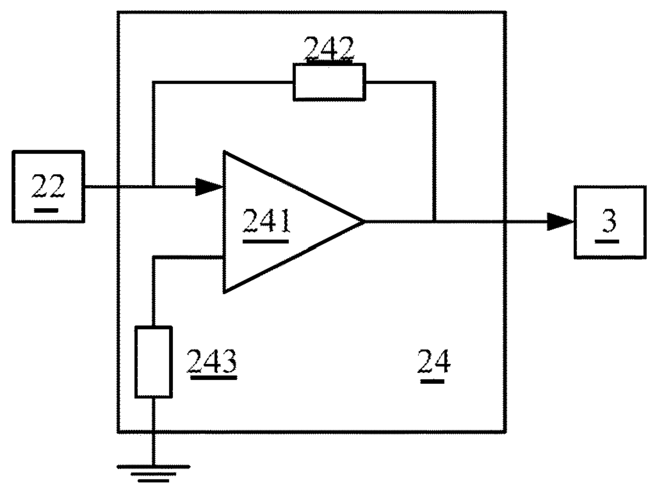
FIG. 5 is a schematic structural diagram for second amplifying circuit according to some embodiments.

As shown in FIG. 5, the second amplifying circuit 24 includes:

The second operational amplifier 241, the positive input end of the second operational amplifier 241 is connected with the third end of the switching module 22;

The third resistor 242, one end of the third resistor 242 is connected with the positive input end of the second operational amplifier 241, and the other end of the third resistance 242 is connected with the output end of the second amplifier 241;

The fourth resistor 243, one end of the fourth resistor 243 is connected with the negative input end of the second operational amplifier 241, and the other end of the fourth resistance 243 is ground connected;

Wherein, the resistance value of the third resistor 242 is positively correlated with temperature, and/or the resistance value of the fourth resistor 243 is negatively correlated with temperature.

In some embodiments, the second operational amplifier 241, the third resistor 242, and the fourth resistor 243 are connected according to the connection manner shown in FIG. 5, so that the second amplification factor F1 of the second amplification circuit 24 is F2=Rf2/Rin2, so by setting the resistance value Rf2 of the third resistor 242 to be negatively correlated with temperature, and/or the resistance value Rin2 of the fourth resistor 243 to be positively correlated with the temperature, the second amplification factor F2 can be negatively correlated with the temperature, thereby achieving compensation for noise floor in the second preset range.

In some embodiments, the receiver array 1 includes a plurality of avalanche photodiodes; the optical signal is an infrared laser signal; while, the laser sensor further includes: vertical external surface emission laser, which is designed to send infrared laser signals.

Figure 6:
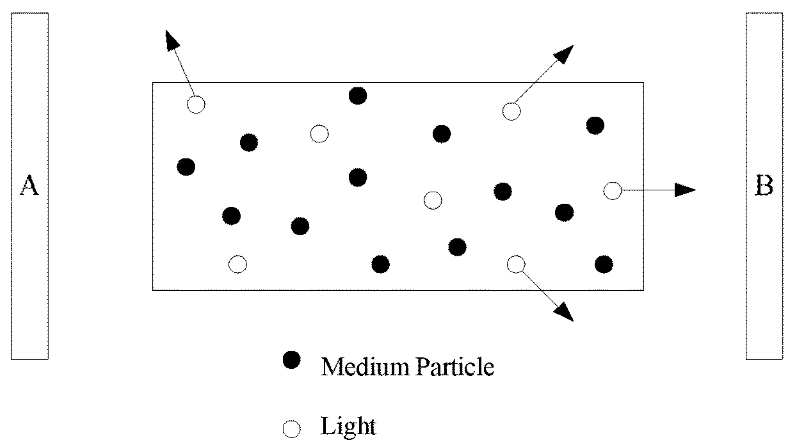
FIG. 6 is a schematic structural diagram for a vertical external surface emission laser according to some embodiments.

As shown in FIG. 6, the optical cavity of different modes can be selected by using the principle of optical cavity. The light is emitted by the light source pump, can be redirected when the light is incident on the medium and collides with the medium particles in the medium. Wherein, an optical lens is placed on each side of the medium, wherein optical lens A is a total reflection optical lens. The light is reflected by optical lens A, and optical lens B is a partial projection optical lens, so that the path of the light emitted by the light source pump can be changed by reflecting, scattering and refracting, and finally the laser light is emitted in a direction perpendicular to the surface of optical lens B. Vertical external surface emission laser can send lasers ranging from 850 nm to 940 nm.

Figure 7:
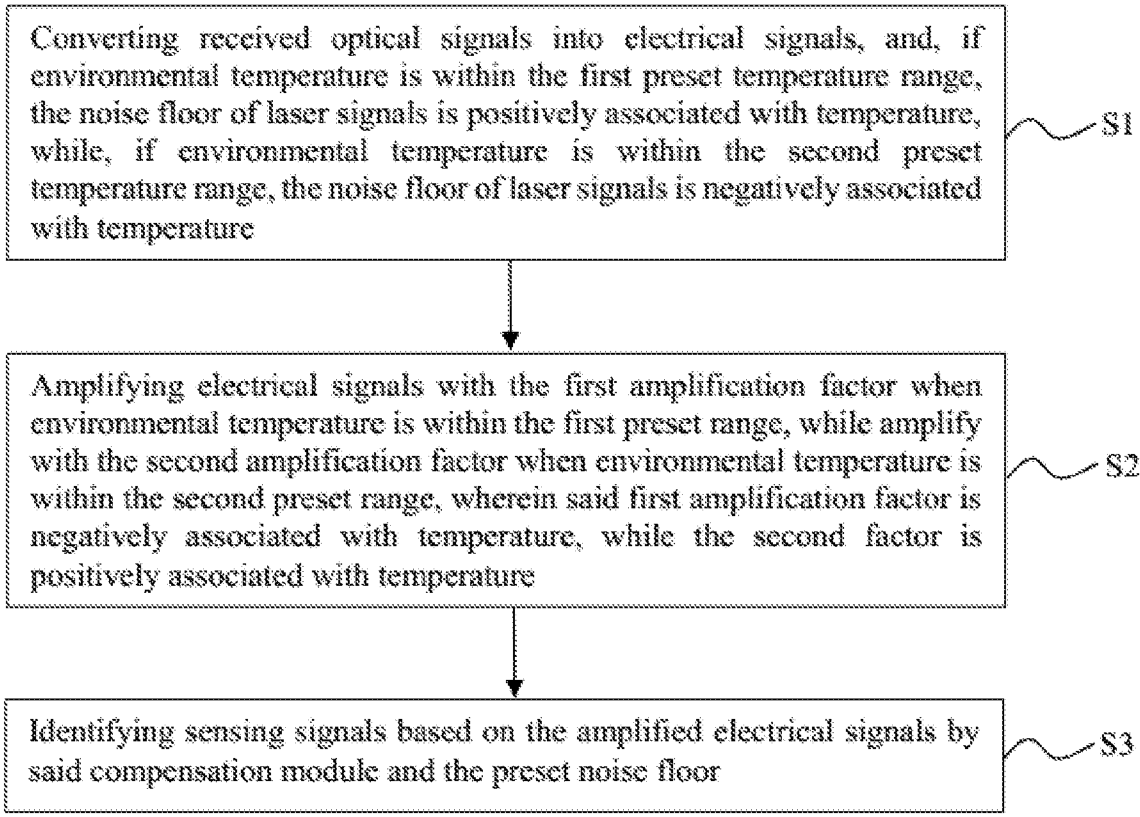
FIG. 7 is a schematic structural diagram for a method of noise floor compensation for electrical signals according to some embodiments.

As shown in FIG. 7, the method of noise floor compensation for electrical signals includes:

Step S1: converting received optical signals into electrical signals, and, if environmental temperature is within the first preset temperature range, the noise floor of electrical signals is positively correlated with temperature, while, if environmental temperature is within the second preset temperature range, it is negatively correlated with temperature;

Step S2: amplifying electrical signals with the first amplification factor when environmental temperature is within the first preset range, while amplify with the second amplification factor when environmental temperature is within the second preset range, wherein the first amplification factor is negatively correlated with temperature, while the second factor is positively correlated with temperature;

Step S3: identifying sensing signals based on the amplified electrical signals and the preset noise floor.

In some embodiments, in addition to the embodiment shown in FIG. 1, i.e. the compensation of the laser sensor can be realized by hardware, the compensation of the laser sensor can also be realized by software. According to different temperatures, different algorithms can be used to realize compensation for noise floor in different temperature ranges.

In some embodiments, an electronic device includes:

Storage, which is designed to store executable instructions of the processor;

A laser sensor, wherein the laser sensor includes:

A receiver array 1, which converts received optical signals into electrical signals, and, if environmental temperature is within the first preset temperature range, the noise floor of electrical signals is positively correlated with temperature, while if the environmental temperature is within the second preset temperature range, it is negatively correlated with temperature;

A compensation module 2, connected with the receiver array 1, is designed to receive the electrical signals, and to amplify electrical signals with the first amplification factor when environmental temperature is within the first preset range, while amplify with the second amplification factor when environmental temperature is within the second preset range, wherein the first amplification factor is negatively correlated with temperature, while the second factor is positively correlated with temperature;

A processor 3, is connected with the compensation module 2, which is designed to identify sensing signals based on the amplified electrical signals and the preset noise floor.

Some embodiments also provide a computer-readable storage medium, which stores computer programs, following the steps below when executed by a processor:

1. Converting received optical signals into electrical signals, and, if environmental temperature is within the first preset temperature range, the noise floor of electrical signals is positively correlated with temperature, while, if environmental temperature is within the second preset temperature range, it is negatively correlated with temperature;

2. Amplifying electrical signals with the first amplification factor when environmental temperature is within the first preset range, while amplify with the second amplification factor when environmental temperature is within the second preset range, wherein the first amplification factor is negatively correlated with temperature, while the second factor is positively correlated with temperature;

3. Identifying sensing signals based on the amplified electrical signals and the preset noise floor.

Figure 8:
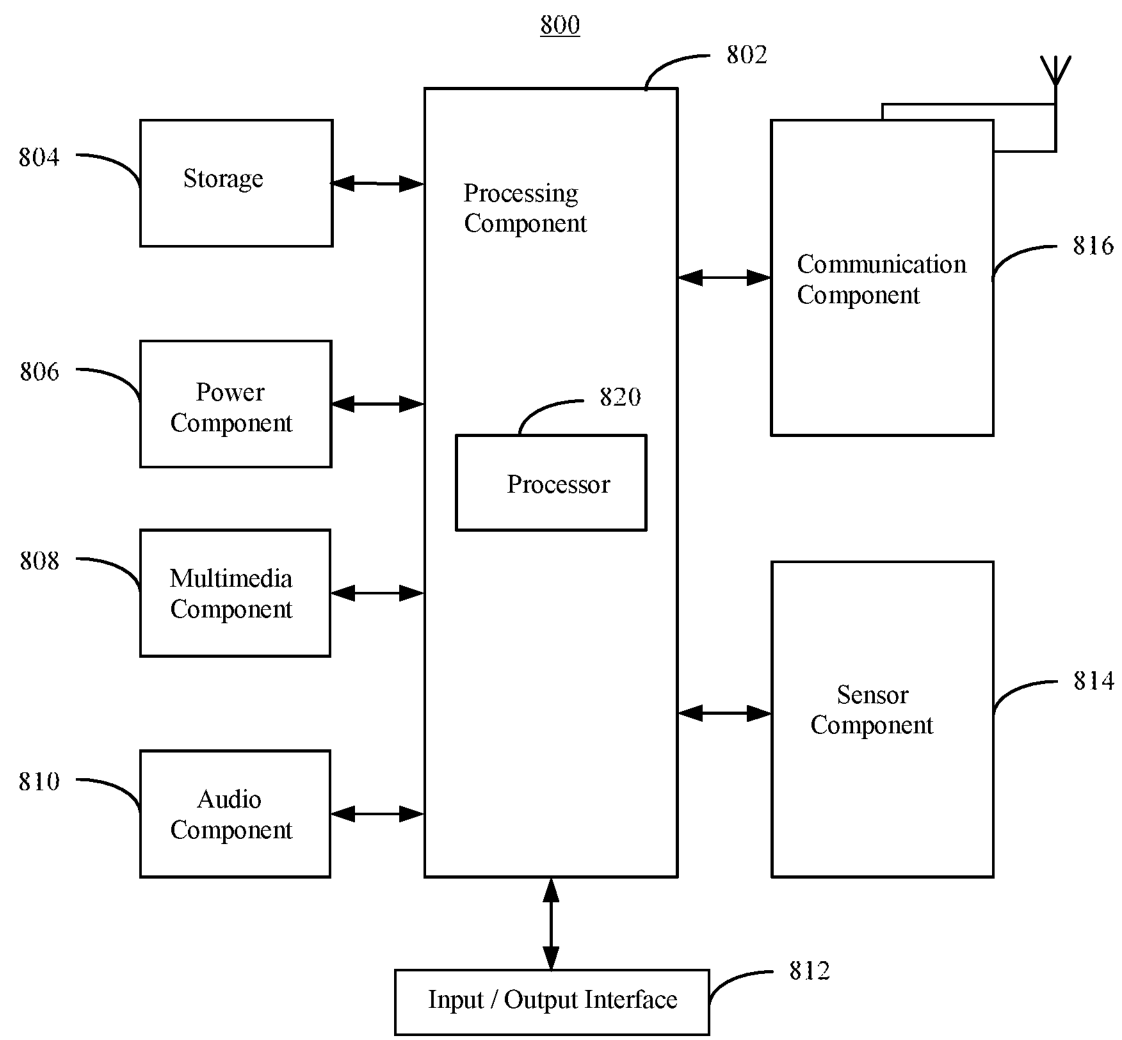
FIG. 8 is a schematic structural diagram of a device designed for noise floor compensation for electrical signals according to some embodiments.

As shown in FIG. 8, the device 800 for noise floor compensation of electrical signals may be a mobile phone, a computer, a digital broadcast terminal, a messaging device, a game console, a tablet device, a medical device, a fitness device, a personal digital assistant, etc.

Referring to FIG. 8, the device 800 can include one or more of the following components: a processing component 802, a memory 804, a power component 806, a multimedia component 808, an audio component 810, an input/output (I/O) interface 812, a sensor component 814, and communication component 816.

The device 800 may also include a laser sensor. The laser sensor includes: a receiver array 1, which converts received optical signals into electrical signals, and, if environmental temperature is within the first preset temperature range, the noise floor of electrical signals is positively correlated with temperature, while if the environmental temperature is within the second preset temperature range, it is negatively correlated with temperature;

A compensation module 2, connected with the receiver array 1, is designed to receive the electrical signals, and to amplify electrical signals with the first amplification factor when environmental temperature is within the first preset range, while amplify with the second amplification factor when environmental temperature is within the second preset range, wherein the first amplification factor is negatively correlated with temperature, while the second factor is positively correlated with temperature;

A processor 3, is connected with the compensation module 2, which is designed to identify sensing signals based on the amplified electrical signals and the preset noise floor.

Processing component 802 is typically used to control the overall operation of device 800, such as operations correlated with display, telephone calls, data communications, camera operations, and recording operations. Processing component 802 can include one or more processors 820 to execute instructions to perform all or part of the steps of the noise floor compensation method described above. In addition, processing component 802 can also include one or more modules to facilitate interaction between component 802 and other components. In an example, processing component 802 can include a multimedia module to facilitate interaction between multimedia component 808 and processing component 802.

Memory 804 is configured to store various types of data to support operations on device 800. Examples of such data include instructions for any application or method operating on device 800, contact data, phone book data, messages, pictures, videos, etc. Memory 804 can be implemented by any type of volatile or non-volatile storage device, or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disks or optical disks.

Power component 806 provides power to various components of device 800. Power component 806 can include a power management system, one or more power sources, and other components correlated with generating, managing, and distributing power for device 800.

The multimedia component 808 includes a screen that provides an output interface between the device 800 and a user. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor can not only sense the boundaries of the touch or swipe action, but can also detect the duration and pressure correlated with the touch or slide operation. In some embodiments, the multimedia component 808 includes a front camera and/or a rear camera. When the device 800 is in an operation mode, such as a shooting mode or a video mode, the front camera and/or the rear camera can receive external multimedia data. Each front and rear camera can be a fixed optical lens system or have focal length and optical zoom capabilities.

The audio component 810 is configured to output and/or input an audio signal. In an example, the audio component 810 includes a microphone (MIC) that is configured to receive an external audio signal when the device 800 is in an operational mode, such as a call mode, a recording mode, and a voice recognition mode. The received audio signal may be further stored in memory 804 or transmitted via communication component 816. In some embodiments, the audio component 810 also includes a speaker for outputting an audio signal.

The I/O interface 812 provides an interface between the processing component 802 and a peripheral interface module, which may be a keyboard, a click wheel, a button, etc. These buttons may include but not limited to, a home button, a volume button, a start button, and a lock button.

Sensor component 814 includes one or more sensors, which are designed to provide status assessment of all aspects to device 800. In an example, sensor component 814 can detect Open/Close state of device 800; relative positioning of a component of device 800, which can be a display and a keypad. Sensor component 814 can also detect position change of device 800 or a component of device 800, whether the user is in contact with device 800, orientation changes of device 800 or acceleration/deceleration, and temperature changes of device 800. Sensor component 814 can include a proximity sensor configured to detect the presence of nearby objects without any physical contact. Sensor component 814 may also include an optical sensor, such as a CMOS or CCD image sensor, to be used in imaging applications. In some embodiments, the sensor component 814 can also include an acceleration sensor, a gyro sensor, a magnetic sensor, a pressure sensor, or a temperature sensor.

It is noted that the various device components, units, blocks, or portions may have modular configurations, or are composed of discrete components, but nonetheless may be referred to as "modules" in general. In other words, the "modules" or "units" referred to herein may or may not be in modular forms.

Communication component 816 is configured to facilitate wired or wireless communication between device 800 and other devices. The device 800 can access a wireless network based on a communication standard, such as WIFI, 2G or 3G, or a combination thereof. In some embodiments, communication component 816 receives broadcast signals or broadcast correlated information from an external broadcast management system via a broadcast channel. In some embodiments, the communication component 816 also includes a near field communication (NFC) module to facilitate short range communication. In an example, the NFC module can be implemented based on radio frequency identification (RFID) technology, infrared data association (IrDA) technology, ultra-wideband (UWB) technology, Bluetooth (BT) technology, and other technologies.

In some embodiments, device 800 may be implemented by one or more application specific integrated circuits (ASICs), digital signal processors (DSPs), digital signal processing devices (DSPDs), programmable logic devices (PLDs), field programmable A gate array (FPGA), controller, microcontroller, microprocessor, or other electronic component for performing the above methods.

In some embodiments, the present disclosure also provides a non-transitory computer readable storage medium including instructions, such as a memory 804 including instructions, which is executable by processor 820 of device 800 to perform the above method. In an example, the non-transitory computer readable storage medium may be a ROM, a random-access memory (RAM), a CD-ROM, a magnetic tape, a floppy disk, and an optical data storage device.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the laser sensor is integrated with the mobile phone; in some other embodiments, the laser sensor can be a plug-and-play device for the mobile phone, and can access and be controlled by the programs/apps/instructions stored on the phone. In some implementations, the laser sensor can draw power from the phone. In some other implementations, the laser sensor can have its own battery.

At least some of the embodiments of the present disclosure can have one or more of the following advantages: noise floors in related technical fields vary greatly with temperature, so after the fixed preset noise floor is subtracted, the remaining values are still changeable, that is, the sensing signal obtained is not accurate; according to the embodiment of the present disclosure, the compensated noise floor changes little with temperature, thus the remaining value after fixed preset noise is subtracted also varies little, and then, the remaining value is divided by the amplification factor. The value is relatively accurate, which is conducive to obtaining accurate sensing results.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the electronic device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A laser sensor, comprising:

a receiver array configured to convert received optical signals into electrical signals, wherein a noise floor of the electrical signals is positively correlated with temperature when environmental temperature is within a first preset temperature range, and when the environmental temperature is within a second preset temperature range, the noise floor of electrical signals is negatively correlated with temperature;

a compensation circuit coupled with the receiver array and configured to receive the electrical signals, amplify the electrical signals with a first amplification factor when the environmental temperature is within the first preset temperature range, and amplify with a second amplification factor when the environmental temperature is within the second preset temperature range, wherein the first amplification factor is negatively correlated with the temperature, while the second amplification factor is positively correlated with the temperature; and a processor coupled with the compensation circuit and configured to identify sensing signals based on the electrical signals amplified by the compensation circuit and the noise floor;

wherein the compensation circuit comprises:

a temperature sensor configured to sense environmental temperature;

a switch, a first end connected with the temperature sensor, configured to receive environmental temperature sensed by the temperature sensor, and a second end of which is connected with the receiver array, when the environmental temperature is within the first preset temperature range, a third end of the switch connected with a first amplifying circuit, which is designed to input the electrical signals into the first amplifying circuit, while, when the environmental temperature is within the second preset temperature range, the third end of the switch connected with a second amplifying circuit designed to input the electrical signals into the second amplifying circuit;

wherein as for the first amplifying circuit, an amplification factor is the first amplification factor;

wherein as for the second amplifying circuit, an amplification factor is the second amplification factor.

2. The laser sensor of claim 1, wherein the receiver array comprises a plurality of avalanche photodiodes.

3. The laser sensor of claim 1, wherein the optical signals are infrared laser signals.

4. The laser sensor of claim 1, further comprising: a vertical external surface emission laser configured to send infrared laser signals.

5. The laser sensor of claim 4, wherein the vertical external surface emission laser is configured to send a laser ranging from 850 nm to 940 nm.

6. The laser sensor of claim 1, wherein the first amplifying circuit comprises:

a first operational amplifier, wherein a positive input end of the first operational amplifier is connected with the third end of the switch;

a first resistor, wherein one end of the first resistor is connected with the positive input end of the first operational amplifier, and one other end of the first resistor is connected with an output end of the first operational amplifier; and a second resistor, wherein one end of the second resistor is connected with a negative input end of the first operational amplifier, and one other end of the second resistor is ground connected;

wherein, a resistance value of the first resistor is negatively correlated with temperature, and/or a resistance value of the second resistor is positively correlated with temperature.

7. The laser sensor of claim 1, wherein the second amplifying circuit comprises:

a second operational amplifier, wherein a positive input end of the second operational amplifier is connected with the third end of the switch;

a third resistor, wherein one end of the third resistor is connected with the positive input end of the second operational amplifier, and one other end of the third resistor is connected with an output end of the second operational amplifier;

a fourth resistor, wherein one end of the fourth resistor is connected with a negative input end of the second operational amplifier, and one other end of the fourth resistor is ground connected;

wherein, a resistance value of the third resistor is positively correlated with temperature, and/or a resistance value of the fourth resistor is negatively correlated with temperature.

8. An electronic device, comprising:

a laser sensor, wherein the laser sensor comprises:

a receiver array configured to convert received optical signals into electrical signals, wherein a noise floor of the electrical signals is positively correlated with temperature when environmental temperature is within a first preset temperature range, and when the environmental temperature is within a second preset temperature range, the noise floor of electrical signals is negatively correlated with temperature;

a compensation circuit coupled with the receiver array and configured to receive the electrical signals, amplify the electrical signals with a first amplification factor when the environmental temperature is within the first preset temperature range, and amplify with a second amplification factor when the environmental temperature is within the second preset temperature range, wherein the first amplification factor is negatively correlated with the temperature, while the second amplification factor is positively correlated with the temperature; and a processor coupled with the compensation circuit and configured to identify sensing signals based on the electrical signals amplified by the compensation circuit and the noise floor; and a storage designed to store executable instructions of the processor;

wherein the compensation circuit comprises:

a temperature sensor configured to sense environmental temperature;

a switch, a first end connected with the temperature sensor, configured to receive environmental temperature sensed by the temperature sensor, and a second end of which is connected with the receiver array when the environmental temperature is within the first preset temperature range, a third end of the switch connected with a first amplifying circuit, which is designed to input the electrical signals into the first amplifying circuit, while, when the environmental temperature is within the second preset temperature range, the third end of the switch connected with a second amplifying circuit designed to input the electrical signals into the second amplifying circuit;

wherein as for the first amplifying circuit, an amplification factor is the first amplification factor;

wherein as for the second amplifying circuit, an amplification factor is the second amplification factor.

9. The electronic device of claim 8, wherein the receiver array comprises a plurality of avalanche photodiodes.

10. The electronic device of claim 8, wherein the optical signals are infrared laser signals.

11. The electronic device of claim 8, wherein the laser sensor further comprises: a vertical external surface emission laser configured to send infrared laser signals.

12. The electronic device of claim 11, wherein the vertical external surface emission laser is configured to send a laser ranging from 850 nm to 940 nm.

13. A mobile terminal comprising the device according to claim 8, further comprising a microphone and a speaker.

14. The mobile terminal according to claim 13, wherein the mobile terminal is a mobile phone, and the processor is a central processing unit (CPU) of the mobile phone.

15. The mobile terminal of claim 14, wherein the mobile phone comprises the laser sensor.

16. The electronic device of claim 8, wherein the first amplifying circuit comprises:

a first operational amplifier, a positive input end of the first operational amplifier is connected with the third end of the switch;

a first resistor, one end of the first resistor is connected with the positive input end of the first operational amplifier, and one other end of the first resistor is connected with an output end of the first operational amplifier;

a second resistor, one end of the second resistor is connected with a negative input end of the first operational amplifier, and one other end of the second resistor is ground connected;

wherein a resistance value of the first resistor is negatively correlated with temperature, and/or a resistance value of the second resistor is positively correlated with temperature.

17. The electronic device of claim 8, wherein the second amplifying circuit comprises:

a second operational amplifier, wherein a positive input end of the second operational amplifier is connected with the third end of the switch;

a third resistor, wherein one end of the third resistor is connected with the positive input end of the second operational amplifier, and one other end of the third resistor is connected with an output end of the second operational amplifier;

a fourth resistor, wherein one end of the fourth resistor is connected with a negative input end of the second operational amplifier, and one other end of the fourth resistor is ground connected;

wherein a resistance value of the third resistor is positively correlated with temperature, and/or a resistance value of the fourth resistor is negatively correlated with temperature.

18. A method of noise floor compensation for electrical signals, comprising:

converting received optical signals into electrical signals, wherein in a case that an environmental temperature is within a first preset temperature range, a noise floor of the electrical signals is positively correlated with temperature; and in a case that the environmental temperature is within a second preset temperature range, the noise floor of the electrical signals is negatively correlated with the temperature;

amplifying the electrical signals with a first amplification factor when the environmental temperature is within the first preset temperature range; or amplifying with a second amplification factor when environmental temperature is within the second preset temperature range, wherein the first amplification factor is negatively correlated with the temperature, and the second amplification factor is positively correlated with the temperature; and identifying sensing signals based on the amplified electrical signals and the noise floor.

19. The method of claim 18, wherein when amplifying the electrical signals with the first amplification factor, the identifying sensing signals based on the amplified electrical signals and the noise floor comprises:

subtracting the noise floor from the amplified electrical signals to obtain a difference; and dividing the difference by the first amplification factor to obtain the sensing signals.

20. The method of claim 18, wherein when amplifying the electrical signals with the second amplification factor, the identifying sensing signals based on the amplified electrical signals and the noise floor comprises:

subtracting the noise floor from the amplified electrical signals to obtain a difference; and dividing the difference by the second amplification factor to obtain the sensing signals.

* * * * *